(12) United States Patent
Wang et al.

(10) Patent No.: US 10,699,156 B2
(45) Date of Patent: Jun. 30, 2020

(54) METHOD AND A DEVICE FOR IMAGE MATCHING

(71) Applicant: Peking University Shenzhen Graduate School, Shenzhen (CN)

(72) Inventors: Wenmin Wang, Shenzhen (CN); Ruonan Zhang, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 217 days.

(21) Appl. No.: 15/749,545

(22) PCT Filed: Jan. 13, 2016

(86) PCT No.: PCT/CN2016/070779
§ 371 (c)(1),
(2) Date: Feb. 1, 2018

(87) PCT Pub. No.: WO2017/120794
PCT Pub. Date: Jul. 20, 2017

(65) Prior Publication Data
US 2018/0307940 A1 Oct. 25, 2018

(51) Int. Cl.
*G06K 9/62* (2006.01)
*G06K 9/46* (2006.01)
*G06T 7/33* (2017.01)
(52) U.S. Cl.
CPC .......... *G06K 9/6211* (2013.01); *G06K 9/4671* (2013.01); *G06K 9/623* (2013.01);
(Continued)

(58) Field of Classification Search
CPC .... G06K 9/6211; G06K 9/4671; G06K 9/623; G06K 9/6245; G06K 9/6253; G06K 9/6255; G06K 9/6261; G06T 7/337
See application file for complete search history.

(56) References Cited

U.S. PATENT DOCUMENTS

| | | | |
|---|---|---|---|
| 2014/0126830 A1* | 5/2014 | Suganuma | G06K 9/622 382/225 |
| 2016/0012594 A1* | 1/2016 | Romanik | G06T 7/337 382/203 |

OTHER PUBLICATIONS

Toshev et al., "Image Matching via Saliency Region Correspondences", Jun. 2007, IEEE, Conf. on Computer Vision and Pattern Recognition, p. 1-8 (Year: 2007).*
(Continued)

*Primary Examiner* — Vincent Rudolph
*Assistant Examiner* — Timothy Choi
(74) *Attorney, Agent, or Firm* — SV Patent Service

(57) ABSTRACT

A method for image matching includes acquiring a template image and a target image; acquiring a group of template features according to the template image; extracting a group of target features according to the target image; and according to template features and target features, calculating an degree of image similarity between the template image and each frame of target images, and using a target image with the maximum degree of image similarity as a matched image to the template image. In the image-matching method, image matching is performed by calculating an degree of image similarity between a template image and each target image according to a degree of image similarity between template features and target features, so that non-redundancy of features in an image matching process and correct image matching can be guaranteed, and the image matching accuracy can be improved.

6 Claims, 3 Drawing Sheets

(52) U.S. Cl.
CPC ......... *G06K 9/6245* (2013.01); *G06K 9/6253* (2013.01); *G06K 9/6255* (2013.01); *G06K 9/6261* (2013.01); *G06T 7/337* (2017.01)

(56) References Cited

OTHER PUBLICATIONS

Zhang et al., "Edge-SIFT: Discriminative Binary Descriptor for Scalable Partial-Duplicate Mobile Search", Jul. 2013, IEEE, Transactions on Image Processing, vol. 22, No. 7, p. 2889-2902. (Year: 2013).*

* cited by examiner

US 10,699,156 B2

METHOD AND A DEVICE FOR IMAGE MATCHING

TECHNICAL FIELD

The present invention relates to the field of image technologies, and specially, to a method and a device for image matching.

BACKGROUND OF THE INVENTION

Image matching is basic content in computer vision research. Benefiting from excellent expressiveness of graphs and the ability to store critical information in images, graph matching has been widely used as a method of image matching in the field of social networks, data analysis, complex object recognition, video analysis and other fields in recent years.

Image matching technologies that can process non-rigid objects and deformation are more widely used. Since it is a secondary distribution problem in mathematics, which has an NP hard (non-deterministic polynomial), many methods have been tried on it. However, the issues of assuring non-redundancy of feature points and edges in an image matching process and correct image matching still need to be resolved.

SUMMARY OF THE INVENTION

The present invention provides an image-matching method and an image-matching device to guarantee non-redundancy of feature points and edges in an image matching process and correct image matching.

According to an aspect, the present disclosure provides an image-matching method includes: acquiring a frame of a template image; acquiring a plurality of frames of target images; acquiring a group of template features according to the template image, the group of template features including a plurality of template features; extracting a group of target features from each frame of target images based on the pixel gray scale features of each frame of the target images, wherein the group of target features comprises a plurality of target features; according to the group of template features of the template image and a group of target features of each frame of target images, calculating a degree of image similarity between the template image and each frame of target images to obtain a plurality of degrees of image similarity; acquiring the maximum degree of image similarity according to the plurality of degrees of image similarity; acquiring a target image having maximum degree of image similarity, and using the target image corresponding to the maximum degree of image similarity as a matched image to the template image.

According to a further aspect, the present disclosure further provides an image-matching device, comprising: a first image acquiring unit, wherein the first image acquiring unit can acquire a template image; a second image acquiring unit that can acquire a plurality of frames of target images; a template feature acquiring unit that can acquire a group of template features according to the template image, wherein the group of template features comprise a plurality of template features; a target feature extraction unit that can extract a group of target features from each frame of target images based on the pixel gray scale features of each frame of target images, wherein the group of target features includes a plurality of target features; a similarity calculation unit, wherein the similarity calculation unit can calculate a degree of image similarity between the template image and each frame of target images to obtain a plurality of degrees of image similarity according to the group of template features of the template image and a group of target features of each frame of target images; a matching unit that can acquire the maximum degree of image similarity according to the plurality of degrees of image similarity, acquiring a target image having maximum degree of image similarity, and using the target image corresponding to the maximum degree of image similarity as a matched image to the template image.

In the disclosed image-matching method and image-matching device, image matching is performed by means of respectively calculating a degree of image similarity between a template image and each target image according to a degree of image similarity between template features and target features, so that non-redundancy of features in an image matching process and correct image matching can be guaranteed, and the image matching accuracy can be improved.

DETAILED DESCRIPTION OF THE INVENTION

The present invention will become apparent from the following detailed description of embodiments and from the accompanying drawings.

The present invention relate to an image-matching method and an image-matching device. For example, the image-matching method and the image-matching device may be used to identify a target from a plurality of frames of images that is the same as or similar to another frame of images or a particular target in another frame of images. In the present invention, an image that is the target of the recognition (for example, the "another frame of images") is referred to as a "template image", and the specific target is referred to as a "target of interest". The image to identify the image same as or similar to a "template image" or a "target of interest" from it is referred to as a "target image".

In some embodiments, the features (herein referred to as "template features") that characterize the template image or the target of interest therein may be acquired from the template image by using the template image as a template, wherein the template features may be points (herein referred to as "template feature points") and/or edges (herein referred to as "template feature edges") that can characterize the template image or the target of interest; further, acquiring features from the target image (herein referred to as "target features"), wherein the target features may be points (herein referred to as "target feature points") and/or edges (herein referred to as "target feature edges"); and then according to template features and target features, calculating an image degree of image similarity between the template image and each frame of target images, comparing the obtained degree of image similarity, and using a target image with the maximum degree of image similarity as a matched image to the template image. In some embodiments, "edge" as used herein may be a line segment between two points in an image.

Figure 1:
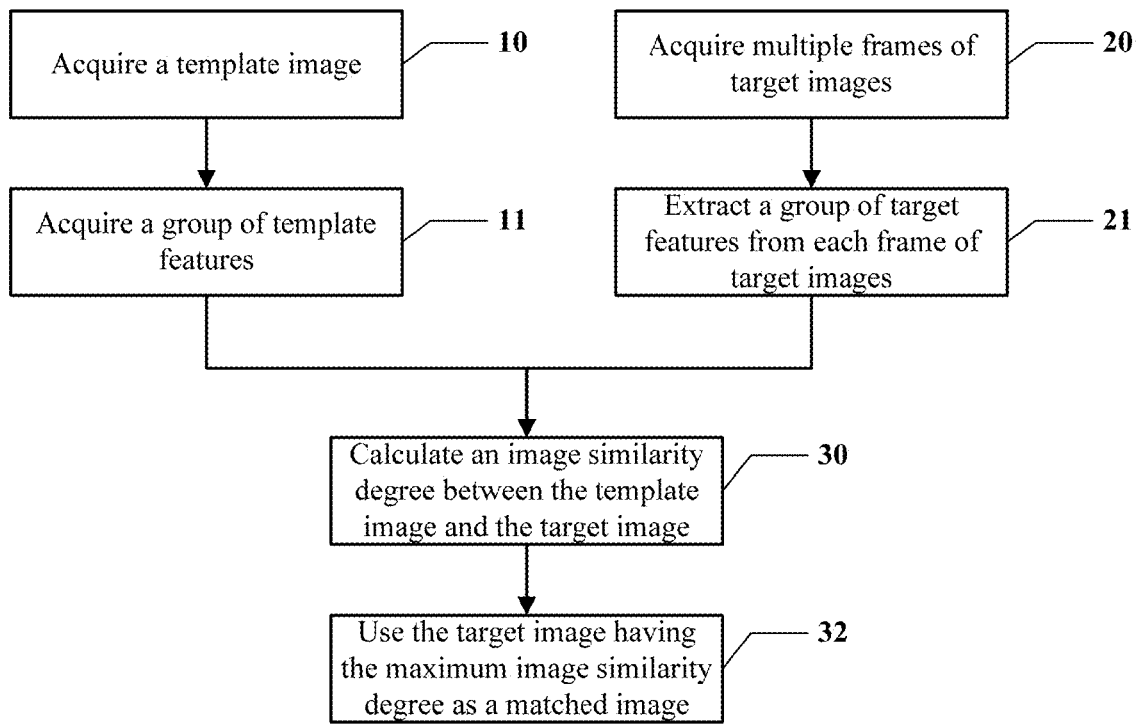
FIG. 1 is a flowchart for a method for an image-matching method according to the present invention.

FIG. 1 illustrates a flowchart of an image-matching method according to some embodiments in the present invention. Referring to FIG. 1, a template image can be acquired in Step 10. The template image can be an image obtained by various imaging devices in real time, or an image previously obtained and stored in a memory of a system of the image-matching method and the image-matching device in the present invention. Therefore, in Step 10, the template image can be obtained by various imaging devices or read from the memory.

After the template image is acquired, in Step 11, a group of template features may be acquired according to the template image. These template features may be special features (positions, gray scales, angles, etc.) in the template image or in the image of the target of interest in the template image, which contain the information and properties of the template image or the target of interest and will characterize points and/or edges of the template image or the target of interest. The group of template features may comprise a plurality of template features that embody the features of the template image or the target of interest.

In some embodiments, the group of template features may be obtained by receiving user input. For example, the user can click on the template image to select the features of the template image or the target of interest via the input device. In some embodiments, the image-matching device can receive the user's input and acquires a group of template features according to the user's input.

In some embodiments, the group of template features may also be extracted from the template image according to the pixel gray feature (e.g., average grey value, gradient, variance, gray level distribution, etc.) of the template image or the target of interest by the image-matching device in the present invention.

In some embodiments, the "group of template features" may comprise all the features input by the user or extracted from the template image, or may comprise only part of the features input by the user or extracted from the template image.

Figure 2:
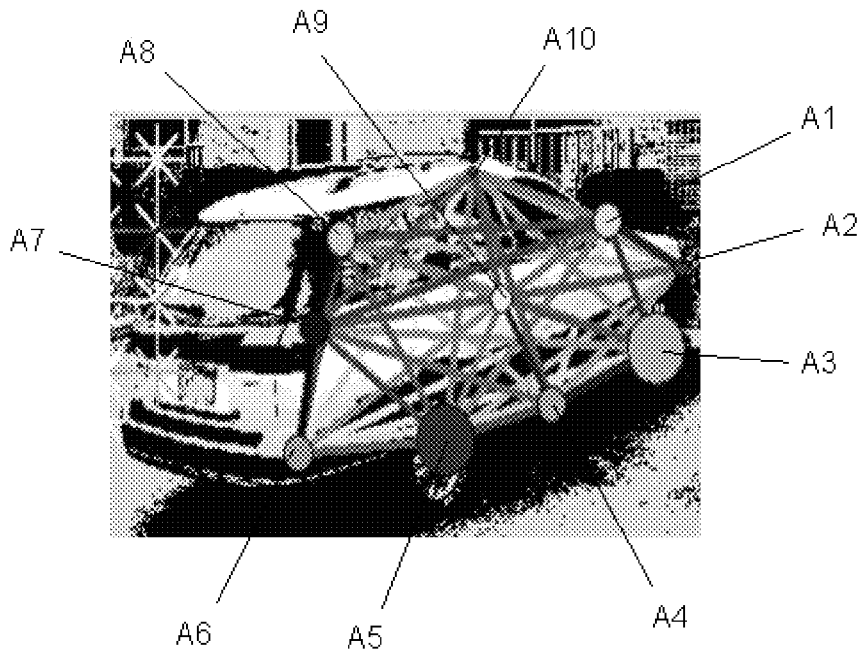
FIG. 2 is a schematic view of a template image and template feature points according to the present invention.

FIG. 2 illustrates a view of a template image according to some embodiments of the present invention, where the target of interest is a car in the template image. Referring to FIG. 2, Point A1, A2, A3, A4, A5, A6, A7, A8, A9 and A10 are template feature points that are input by the user or extracted from the pixel gray scale features of the target of interest (FIG. 2). Referring to FIG. 2, the template feature points A1-A10 are schematically represented as circles of different sizes in order to be clearly displayed. It should be understood that these circles are merely for schematically representing the template feature points, but not intended to limit the size, position, shape and others of the template feature points. Referring to FIG. 2, the line segments between any two points of A1, A2, A3, A4, A5, A6, A7, A8, A9 and A 10 ay also be used as template feature edges.

Figure 3:
FIG. 3 is a schematic view of a target image according to the present invention.

In some embodiments, a template image is shown in FIG. 2, a target image is shown in FIG. 3 (described in details below), and a car in FIG. 2 is a target of interest. According to the disclosed image-matching method and image-matching device, the car in FIG. 3 can match the car in FIG. 2.

In some embodiments, referring to FIG. 1, acquire a plurality of frames of target images in Step 20. Similar to Step 10, the target image may be an image obtained by various imaging devices in real time, or an image previously obtained and stored in a memory of a system of the image-matching method and the image-matching device in the present invention. Therefore, in Step 20, the target image can be obtained by various imaging devices, or read from the memory.

FIG. 3 illustrates a view of a target image according to some embodiments in the present invention.

After the target image is obtained, in Step 21, extract a group of target features from each frame of target images based on the pixel gray scale features of the target image. A variety of suitable image feature extraction methods can be used for acquiring target features from the target image. For example, Maximally Stable Extremal Regions (MSER), Scale Invariant Feature Transform (SIFT), Hessian, Harris Affine or Histogram Attribute Relational Graph (HARG) method can be used to extract a group of target features from each frame of target images.

In some embodiments, the "group of target features" may comprise all the features extracted from the target image, or only part of the features extracted from the target image.

After the template features of the template image and the target features of each frame of template images are acquired, in Step 30, according to the group of template features of the template image and the group of target features of each frame of target images, calculate a degree of image similarity between the template image and each frame of target images to obtain a plurality of degrees of image similarity.

In some embodiments, for each frame of target images, when calculating the degree of image similarity with the template image, the following steps may be performed (in this case, the frame of target images involved in the calculation are referred to as the "current target image"):

First, the degree of image similarity between each of the group of template features of the template image and each of the group of target features of the current target image (herein referred to as "inter-feature similarity") is acquired. It is easy to understand that in this case, when the feature here is a point, the degree of image similarity is the degree of image similarity between the feature points; and when the feature here is an edge, the degree of image similarity is the degree of image similarity between the feature edges. In some embodiments, the features used may be points, edges, or both. In some embodiments, the initialized feature degree of image similarity between template features and target features of each frame of target images can be obtained by using conventional calculation methods in the art, which are not described in details herein.

Further, according to the obtained inter-feature similarity, the features matching each of the group of template features of the template image (herein referred to as "matched target feature") are searched out from the group of target features of the current target image.

Further, according to the inter-feature similarity between the group of template features of the template image and the matched target features of the current target image (as described above, the inter-feature similarity between each template feature and each target feature has been acquired, so the inter-feature similarity between each template feature and each matched target feature is known at this time), the degree of image similarity between the current target image and the template image is calculated.

In some embodiments, when the features matching each of the group of template features of the template image are searched out from the group of target features of the current target image according to the obtained inter-feature similarity, the following steps can be performed for each template feature in the group of template features of the template image (in this case, the template features involved in the calculation are referred to as the "current template features"):

First, according to the inter-feature similarity between the current template features and each of the group of target features of the current target image, a plurality of target features that are closest to the current template features are selected from the group of target features of the current target image, wherein the selected plurality of target features are only a portion, but not all of a group of target features of the current target image. Here, a plurality of target features that are "closest" to the current template features may be a plurality of target features that have maximum inter-feature similarities with the current template features. For example, the inter-feature similarities between the target feature and the current template features are arranged in descending order, wherein a plurality of target features closest to the current template features may be a plurality of top-ranked target features, such as the first two, the first three or the first four, etc.

Further, calculate the weighted average of a plurality of inter-feature similarities between the current template features and the selected plurality of target features (as described above, there is an inter-feature similarity between each template feature and each target feature, so there are a plurality of inter-feature similarities between the current template features and a plurality of target features), acquire the inter-feature similarity closest to the weighted average from the plurality of inter-feature similarities, and use the target features corresponding to the inter-feature similarity closest to the weighted average as the matched target features matching the current template features.

Figure 4:
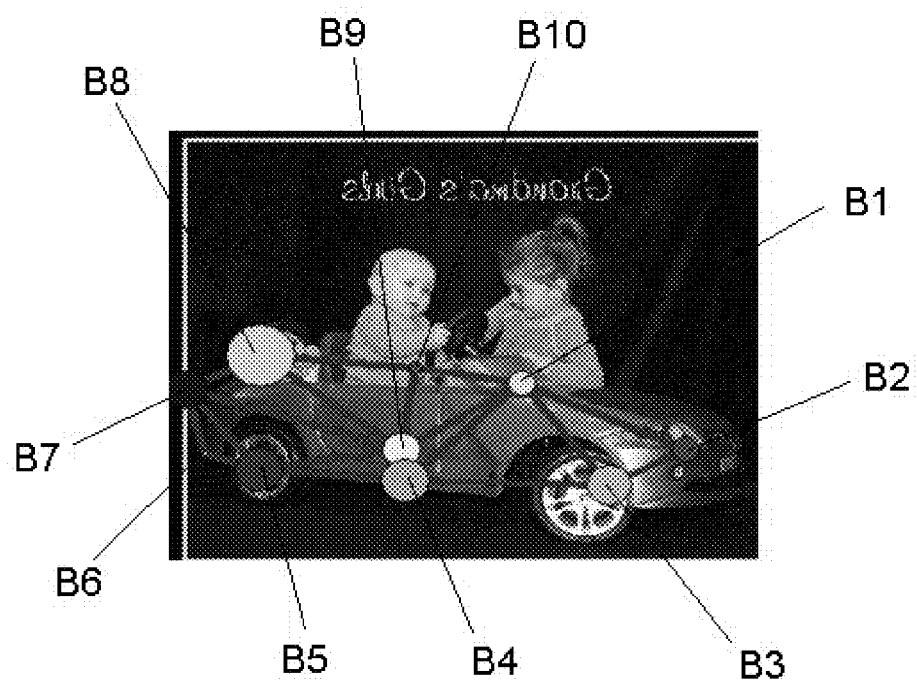
FIG. 4 is a schematic view of the image in FIG. 3 and the matched feature points searched out from the image and matching the template feature points in FIG. 2.

Each template feature point is searched according to above steps. The matched target feature of each template feature can be searched out from the target features. For example, FIG. 4 illustrates a view of the matched target feature points (B1, B2, B3, B4, B5, B6, B7, B8, B9 and B10) searched out from the image in FIG. 3 and matching the template feature points in FIG. 2, wherein these matched target feature points characterize the target in the target image similar to the target of interest in FIG. 2 (i.e. the car in FIG. 2).

In some embodiments, when searching for a matched target feature which matches the template features, a plurality of features around it are involved in the calculation, that is, making reference to a plurality of features around it, so as to improve the accuracy of searching matched target features; in the meantime, not all the target features are involved in the calculation, but the average value of the weighted neighboring values of some of the target features around it is used as a measure, which not only reduces the amount of calculation and avoids the waste of calculation time and resources, but also avoids the interference of target features that are too far away and improves the matching accuracy. That is, in the embodiments, the regional characteristic and the thinning characteristic of the image are taken into consideration comprehensively, the amount of calculation is reduced, and the matching accuracy is also improved.

In some embodiments, the plurality of target features selected from the target features in the group of target features of the current target image that are closest to the current template feature may be three target features, that is, selecting three target features closest to the current template features from the group of target features of the current target image, calculating the weighted average of the degree of image similarity between the current template features and the three target features, and using the target feature among the three target features whose inter-feature similarity with the current template feature is the closest to the average as the matched target feature that matches the current template feature. The inventor has found through research that when three target features are used here a better image matching effect can be obtained.

After acquiring the matched target features that match the template features, the degree of image similarity between the current target image and the template image may be calculated according to the degree of image similarity between the group of template features of the template image and the matched target features as described above. For example, the sum of the degrees of image similarity between the group of template features and the matched target features may be calculated as the degree of image similarity between the current target image and the template image.

For each frame of target images, according to the foregoing process, the degree of image similarity between the each frame of target images and the template image is calculated to obtain a plurality of image similarities. Further, in Step 32, a maximum value among the plurality of image similarities may be obtained according to the obtained plurality of image similarities, that is, a maximum image degree of image similarity may be obtained, and a target image with the maximum degree of image similarity is used as a matched image to the template image.

Figure 5:
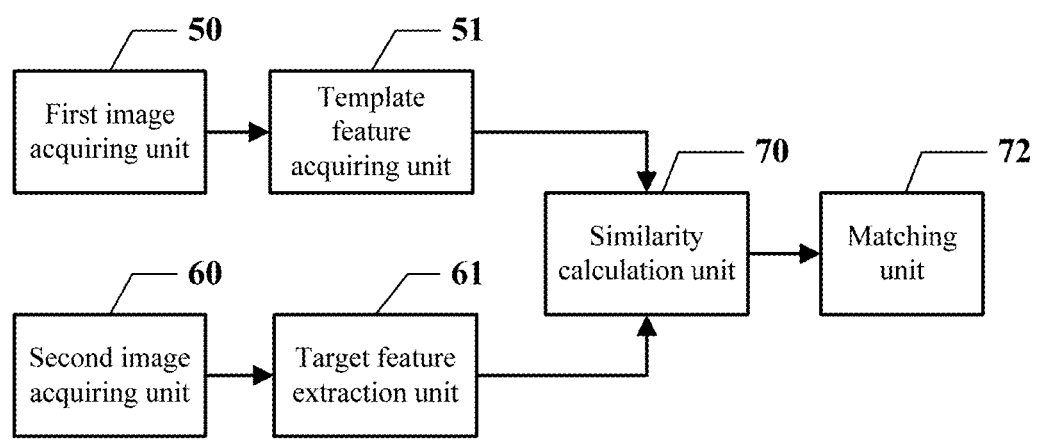
FIG. 5 is a block diagram of an image-matching device according to some embodiments in the present invention.

Correspondingly, referring to FIG. 5, according to some embodiments in the present invention, an image-matching device is further provided, wherein the image-matching device may comprise a first image acquiring unit 50, a second image acquiring unit 60, a template feature acquiring unit 51, a target feature extraction unit 61, a similarity calculation unit 70 and a matching unit 72. The image-matching device may perform the image-matching methods in the various embodiments described herein above. For example, a first image acquiring unit 50 can acquire a template image; a second image acquiring unit 60 can acquire a plurality of frames of target images; a template feature acquiring unit 51 can acquire a group of template features according to the template image, wherein the group of template features comprise a plurality of template features; a target feature extraction unit 61 can extract a group of target features from each frame of target images based on the pixel gray scale features of each frame of target images, wherein the group of target features comprise a plurality of target features; a similarity calculation unit 70 can calculate a degree of image similarity between the template image and each frame of target image using a target image with the maximum degree of image similarity as a matched image to the template image according to the group of template features of the template image and the group of target features of each frame of target images to obtain a plurality of degrees of image similarity; and a matching unit 72 can acquire the maximum degree of image similarity according to the plurality of degrees of image similarity, acquiring the target image with the maximum degree of image similarity, and a similarity calculation unit 70 can calculate a degree of image similarity between the template image and each frame of target image using a target image with the maximum degree of image similarity as a matched image to the template image.

In some embodiments, a template feature acquiring unit 51 can receive the user's input and acquiring a group of template features according to the user's input, and/or extracting a group of template features from the template image according to the pixel gray features of the template image.

In some embodiments, a target feature extraction unit 61 can extract the group of target features from the target image by using Maximally Stable Extremal Regions (MSER), Scale Invariant Feature Transform (SIFT), Hessian, Harris Affine or Histogram Attribute Relational Graph (HARG) method.

In some embodiments, a similarity calculation unit 70 can perform the following steps on each frame of target images:

acquiring the inter-feature similarity between each of the group of template features of the template image and each of the group of target features of the current target image;

searching for matched target features which match each template feature in the group of template features of the template image from the group of target features of the current target image according to the inter-feature similarity; and according to the inter-feature similarity between the group of template features and the matched target features of the current target image, calculating the degree of image similarity between the current target image and the template image.

In some embodiments, the similarity calculation unit 70 can perform the following steps when searching for matched target features which match each template feature in the group of template features of the template image from the group of target features of the current target image according to the inter-feature similarity;

selecting a plurality of target features that are closest to the current template feature from the group of target features of the current target image according to the inter-feature similarity between the current template feature and each of the group of target features of the current target image, wherein the plurality of target features are only a portion of the group of target features of the current target image;

calculating the weighted average of a plurality of inter-feature similarities between the current template features and the plurality of target features; and acquiring the inter-feature similarity closest to the weighted average from the plurality of inter-feature similarities, and using the target feature corresponding to the inter-feature similarity closest to the weighted average as a matched target feature matching the current template feature.

In some embodiments, the similarity calculation unit 70 can select three target features closest to the current template feature from the group of target features of the current target image, calculating the weighted average of the degree of image similarity between the current template features and the three target features, and using the target feature among the three target features whose inter-feature similarity with the current template feature is the closest to the average as the matched target feature that matches the current template feature.

In some embodiments, a matching unit 72 can calculate the sum of the degrees of image similarity between the group of template features of the template image and the matched target features of the current target image as the degree of image similarity between the current target image and the template image.

In the image-matching method and the image-matching device in the above embodiments, image matching is performed by means of respectively calculating a degree of image similarity between a template image and each target image according to a degree of image similarity between template features and target features, so that non-redundancy of features in an image matching process and correct image matching can be guaranteed, and the image matching accuracy can be improved.

It is understood by those skilled in the field that all or part of steps of various methods according to the embodiments may be programmed to instruct the associated hardware to achieve the goals, which may be stored in a readable storage medium of computer, e.g. read-only memory, random access memory, disk or CD.

The above contents are further detailed description of the present invention in connection with the disclosed embodiments. The invention is not limited to the embodiments referred to, but may be deduced, varied modifier replaced by those skilled in the field based on the idea of the present invention.

What is claimed is:

1. A method for image matching, comprising:

acquiring a frame of a template image;

acquiring a plurality of frames of target images;

acquiring a group of template features according to the template image, wherein the group of template features comprise a plurality of template features;

extracting a group of target features from each frame of target images based on pixel gray scale features of each frame of target images, wherein the group of target features comprises a plurality of target features;

according to the group of template features of the template image and a group of target features in each frame of the target images, calculating a degree of image similarity between the template image and each frame of target images to obtain a plurality of degrees of image similarity, comprising:

on each frame of target images, acquiring the inter-feature similarity between each of the group of template features of the template image and each of the group of target features of a current target image;

searching for matched target features which match each template feature in the group of template features of the template image from the group of target features of the current target image according to the inter-feature similarity; and calculating the degree of image similarity between the current target image and the template image according to the inter-feature similarity between the group of template features and the matched target features of the current target image, wherein searching for matched target features comprises:

selecting a plurality of target features that are closest to the current template feature from the group of target features of the current target image according to the inter-feature similarity between the current template feature and each of the group of target features of the current target image, wherein the plurality of target features are only a portion of the group of target features of the current target image;

calculating a weighted average of the plurality of inter-feature similarities between the current template features and the plurality of target features; and acquiring the inter-feature similarity closest to the weighted average from the plurality of inter-feature similarities, and using the target feature corresponding to the inter-feature similarity closest to the weighted average as a matched target feature matching the current template feature;

acquiring a maximum degree of image similarity according to the plurality of degrees of image similarity;

acquiring a target image having maximum degree of image similarity; and using the target image corresponding to the maximum degree of image similarity as a matched image to the template image.

2. The method of claim 1, wherein acquiring a group of template features according to the target image comprises:

receiving a user's input and acquiring a group of template features according to the user's input; or extracting the group of template features from the template image according to the pixel gray scale features of the template image.

3. The method of claim 1, wherein acquiring a group of target features from each frame of target images comprises:

extracting the group of target features from one of target images using a method from a group comprising Maximally Stable Extremal Regions (MSER), Scale Invariant Feature Transform (SIFT), Hessian, Harris Affine, or Histogram Attribute Relational Graph (HARG).

4. The method of claim 1, wherein the step of selecting a plurality of target features that are closest to the current template feature from the group of target features of the current target image comprises:

selecting three target features closest to the current template feature from the target features of the group of target features of the current target image.

5. The method of claim 1, wherein calculating the degree of image similarity between the current target image and the template image according to the inter-feature similarity between the group of template features and the matched target features of the current target image comprises:

calculating a sum of the degrees of image similarity between the group of template features and the matched target features of the current target image as the degree of image similarity between the current target image and the template image.

6. The method of claim 1, wherein the template feature is a template feature point, the target feature is a target feature point, the inter-feature similarity is a degree of image similarity between feature points, and the matched target feature is a matched target feature point, wherein the template feature is a template feature edge, the target feature is a target feature edge, the inter-feature similarity is a degree of image similarity between feature edges, and the matched target feature is a matched target feature edge.

* * * * *